(No Model.) 2 Sheets—Sheet 2.
R. S. ANGELL.
TRACTION ENGINE.
No. 571,326. Patented Nov. 17, 1896.
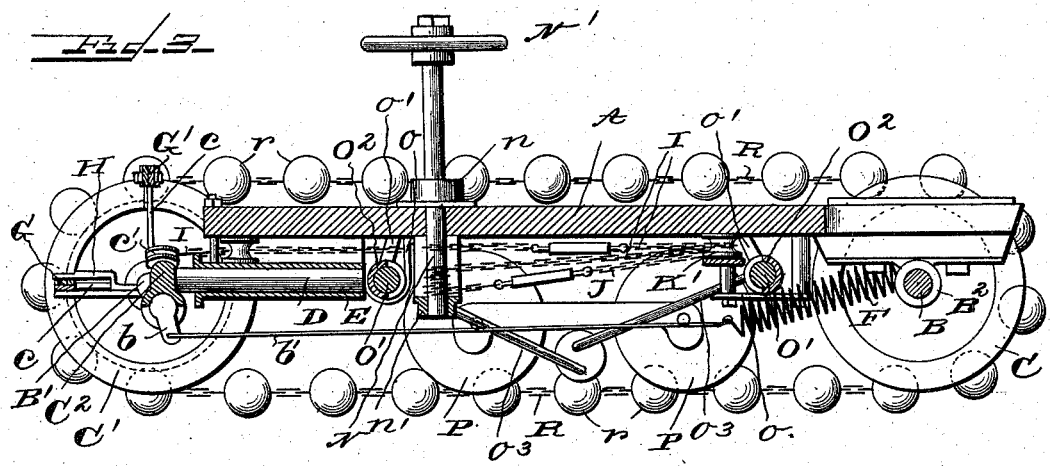
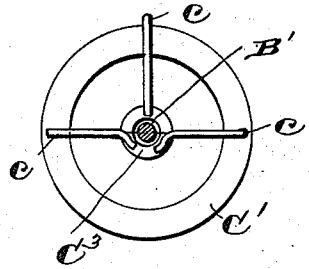
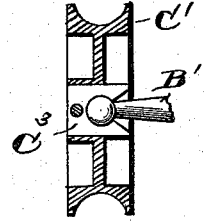
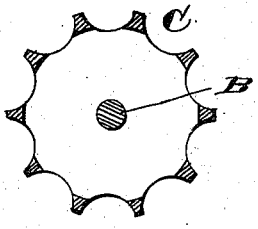
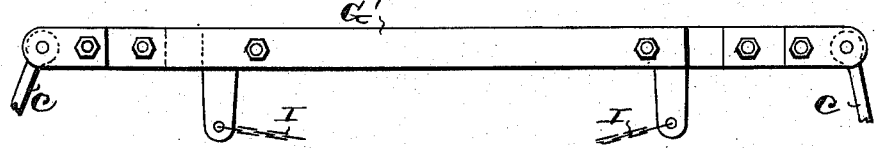
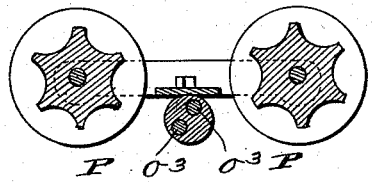
Witnesses
G. A. Faubenschmidt,
Wm. H. Bates
Inventor
Ransom S. Angell
By Edw. J. Underwood
Attorney

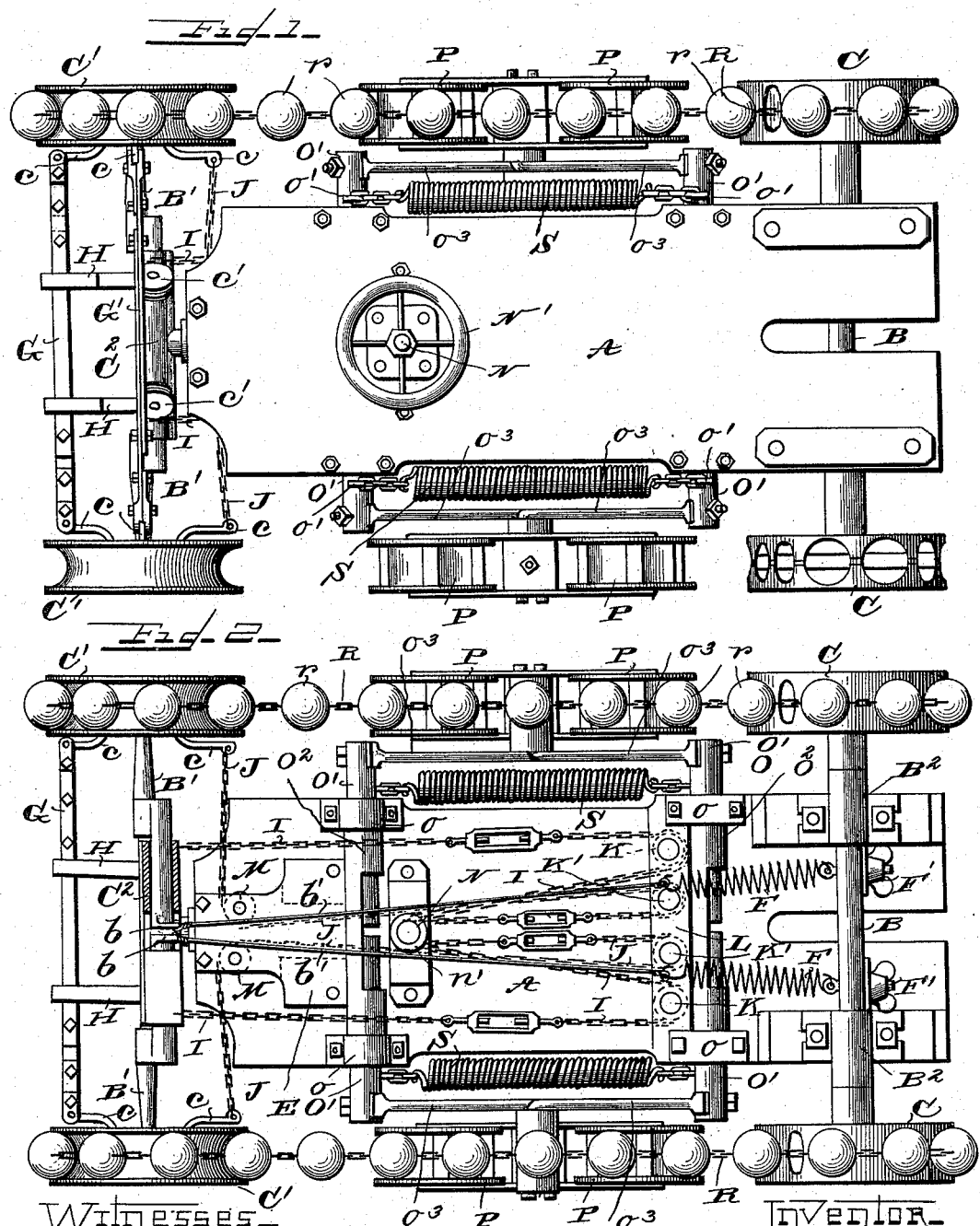

UNITED STATES PATENT OFFICE.

RANSOM S. ANGELL, OF OAKES, NORTH DAKOTA.

TRACTION-ENGINE.

SPECIFICATION forming part of Letters Patent No. 571,326, dated November 17, 1896.

Application filed June 20, 1896. Serial No. 596,281. (No model.)

*To all whom it may concern:*

Be it known that I, RANSOM S. ANGELL, a citizen of the United States, residing at Oakes, in the county of Dickey and State of North Dakota, have invented certain new and useful Improvements in Traction-Engines; and I do hereby declare the following to be a full, clear, and exact description of the invention, such as will enable others skilled in the art to which it appertains to make and use the same.

My invention relates to the class of traction-engines which are provided with front wheels capable of being tilted or inclined when encountering obstructions and turned to right or left at will, and having a double front crank-axle connected by chains with a steering post or stem, whereby the course of the machine is changed, and further provided with balled chains, forming an endless track for the wheels on each side of the engine.

The objects of my invention are to enable obstacles to be passed over and sharp turns to be made without endangering the engine or causing it to leave its tracks.

In the accompanying drawings, in which like letters indicate like parts in the several figures, Figure 1 is a top plan view; Fig. 2, a bottom plan view; Fig. 3 a central longitudinal vertical section. Figs. 4, 5, and 6 are detail views. Fig. 7 is an enlarged detail view of one of the cross-bars. Fig. 8 is a sectional view of one pair of tension-wheels.

Referring to the drawings, A designates the body or bed of the machine mounted upon axles B and B'.

C are the rear wheels, and C' the front wheels, the latter revolving on the ends of the axle B'.

The rear axle B is held in clips or bearings $B^2$, secured to the under side of the rear end of the machine-body in any suitable manner, and its wheels, which are fast to the axle, are attached by means of the axle passing through the said clips or bearings $B^3$.

The forward axle consists of a two-part crank B' B', having its inner ends held in a frame $C^2$, provided with a rearwardly-projecting arm D, which enters a socket in a boxing E, secured to the under side of the front of the body or bed of the engine, and by turning therein permits the axle-ends to be raised or lowered. The inner ends of the axles B' have downwardly-projecting arms $b$, which receive the extremities of rods $b'$, passing back under the body and connected with coiled springs F, adjustably secured to the body by means of thumb-screws F'.

The outer ends of the front axles B' have ball-bearings in the hubs $C^3$ of the front wheels C'. From the inner sides of the front wheel-hubs project three arms $c$, two horizontally and one vertically.

The front horizontal arms $c$ are pivoted in the ends of a cross-bar G, supported by forks H, projecting in front of the frame $C^2$, which supports the double crank or front axle. The vertical arms $c$ are in like manner pivoted in the ends of a cross-bar G', to which the steering-chains I are attached. These chains cross each other and pass around sheaves $c'$ on the frame $C^2$, thence rearwardly to sheaves K, held in a frame L, secured to the under side of the body or bed A of the engine, thence forward to the steering post or stem, round which they are wound, and by means of said steering-post the front wheels are canted or turned to right and left. The purpose of the arms $c$ is to connect the steering-chains and the bars G and G' with the forward wheels, and the function of the bars is to hold and brace the two-part axle together and at the same time permit the front wheels to be canted or inclined when turning or in passing over an obstruction. Attached to the rear horizontal arms $c$ of the front wheel-hubs $C^3$ are other chains J, which pass around sheaves M, mounted between the boxing E and the bed, thence rearwardly to sheaves K', mounted in the frame L between the sheaves K, and thence passing to and around the steering-post. This steering-post N is mounted in the bed of the engine by means of two sockets, one, $n$, above and one, $n'$, below, and has at its top a wheel N', by which it is turned and the course of the engine regulated.

O represents a central frame consisting of four cross-rods O', arranged in pairs contained in cylinders $O^2$, attached to the under side of the bed by means of clips $o$, and having other rods $O^3$ passed through their outer extremities and extending longitudinally of the engine-bed and bent outwardly at a right angle to form short axles, on which is carried a frame supporting a pair of tension-wheels P on each side, which run between the track-chains, resting upon that portion of the track which is upon the ground. The forward wheels C' have double-rimmed peripheries to retain the endless tracks, the rear wheels C have a series of cup-shaped openings in their peripheries to receive the track-balls and allow mud or dirt taken up by the track to pass through, and the tension-wheels P are provided with double rims and ribs for the purpose of retaining the track-chains.

R are chains provided at stated distances with balls $r$ to engage with the cup-shaped openings in the rear wheels, and said chains extend around the peripheries of the wheels C and C' on each side of the engine and form endless tracks on which the engine runs, and as nearly one half of said chains is always upon the ground the desired surface-contact is secured and the tracks are centrally supported by the tension-wheels P, each pair supporting about one-sixth of the weight of the track. The outer ends of the cross-rods O' have upright arms $o'$, to which are secured lateral spiral springs S, which regulate the tension on the wheels P when obstacles are encountered.

The purpose of the tension-wheels P is to aid in supporting the endless track as well as the engine and to lift and extend the track when obstructions are met and passed over.

Any suitable motor secured on the rear of the bed or body may be employed to propel the same.

Having thus fully described my invention, what I claim therein as new, and desire to secure by Letters Patent, is—

1. In a traction-engine the combination with the body or bed A, carrying a suitable motor, of the front axle consisting of a two-part crank B'; the tubular frame $C^2$, having a rearwardly-projecting arm D; a boxing secured to the under side of the bed, and receiving the arm D; the wheels C', mounted on the axle ends in ball-bearings; and provided with double-rimmed peripheries, all constructed arranged and operating as hereinbefore described.

2. In a traction-engine the combination with the body or bed, of a front axle secured to the body as described, and consisting of a two-part crank B'; the frame $C^2$, having the projecting arm D; the boxing E, provided with the socket to receive the arm D; the wheels C', mounted in ball-bearings, on the axle ends; their hubs having the three arms $c$; the cross-bar G, secured to the front horizontal arm $c$; and the retaining-forks H, all constructed, arranged and operating substantially as described.

3. In a traction-engine the combination with the body, of the two-part cranked front axle, each half B', having a projecting arm; rods extending from said arms to the coiled springs F; the boxing receiving the arm extending rearwardly from frame $C^2$; the front wheels mounted in ball-bearings, having hubs provided with three projecting arms $c$; the cross-bars G, and G'; the latter connected with the steering-chain I; the said chain; sheaves $c'$, on the frame $C^2$; other sheaves K', secured to the body of the engine; and the steering-post N, all constructed arranged and operating substantially as described.

4. In a traction-engine, the combination with the body or bed A, of the frame O, consisting of the cross-rods O', the cylinders $O^2$, suitably attached to the bed—the lateral rods $O^3$, bent to form axles for the tension-wheel frame; the said frame; the tension-wheels P; the balled chains R, forming endless tracks; the wheels C, having peripheral cups to receive the endless tracks; and the wheels C', having double rims to retain the track-chains R, all constructed arranged and operating as hereinbefore described.

5. In a traction-engine, the combination with the body, of the double-cranked front axle B'; the wheels C', having ball-bearings upon the ends of said axle, and double-rimmed peripheries; the rear axle B, having wheels revolving with it; the endless tracks consisting of the chains R, provided with the balls $r$ arranged to fit with the front and rear wheels and the tension-wheels, the frame O, for the tension-wheels; and the said tension-wheels, all constructed arranged and operating as hereinbefore described.

6. In a traction-engine, the combination with the body or bed A, of the frame O, consisting of the cross-rods O', provided with the upright arms $o'$ the lateral spiral springs S; the containing-cylinders $O^2$ suitably attached to the bed, the lateral rods $O^3$ forming axles or supports for the tension-wheel frame; the said frame; the tension-wheels P, provided with double rims and ribs for retaining the track-chains; and the said chains R, forming endless tracks, all constructed, arranged and operating as hereinbefore described.

In testimony whereof I have affixed my signature in presence of two witnesses.

RANSOM S. ANGELL.

Witnesses:
E. W. WESTON,
A. B. CHANDLER.